United States Patent [19]

Aasen

[11] 4,209,279
[45] Jun. 24, 1980

[54] BOAT TRAILER LOADING GUIDE

[76] Inventor: Leon J. Aasen, 4940 Northern Rd., Mound, Minn. 55364

[21] Appl. No.: 943,320

[22] Filed: Sep. 18, 1978

[51] Int. Cl.² .............................................. B60P 1/52
[52] U.S. Cl. .................................. 414/534; 280/414 R
[58] Field of Search ................ 193/35 R; 280/414 R; 414/534, 535, 533, 532, 529, 494; 198/785

[56] References Cited

U.S. PATENT DOCUMENTS

| | | | |
|---|---|---|---|
| 2,827,304 | 3/1958 | Backus | 280/414 R |
| 2,977,012 | 3/1961 | Maunula | 414/534 |
| 3,021,969 | 2/1962 | Peake et al. | 414/533 |
| 3,026,981 | 3/1962 | Youtie | 198/785 |
| 3,031,093 | 4/1962 | Holsclaw | 414/533 |
| 3,127,042 | 3/1964 | Beckham | |
| 3,477,815 | 6/1969 | West | 414/534 |
| 3,547,285 | 12/1970 | Plummer | 414/534 |
| 3,603,465 | 9/1971 | King | 414/532 |

Primary Examiner—Lawrence J. Oresky

Attorney, Agent, or Firm—Schroeder, Siegfried, Ryan, Vidas, Steffey & Arrett

[57] ABSTRACT

This invention relates to a loading guide removably mountable on a boat trailer to maintain a centering and guiding force on the boat hull as it is moved on the guide rollers through a winch and cable system associated with the trailer. The loading guide employs a pair of crossed guide levers pivotally connected to the loading guide and having guide roller members at the ends of the same. The guide levers are pivotally interconnected at their point of crossing on the frame of the loading guide and the opposite ends are interconnected through links coupled to a tensioning spring which applies a force to the roller members on the ends of the crossed guide levers engaging the boat hull for centering the same. The guide levers, which are biased from the single spring, insure a positive centering force which increases as the hull is displaced from a centered position to insure positive centering of a boat on a trailer.

9 Claims, 6 Drawing Figures

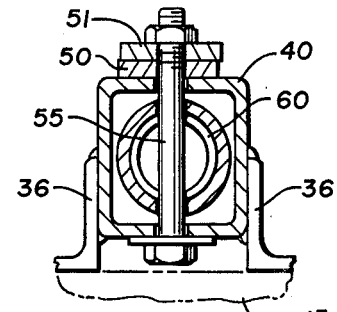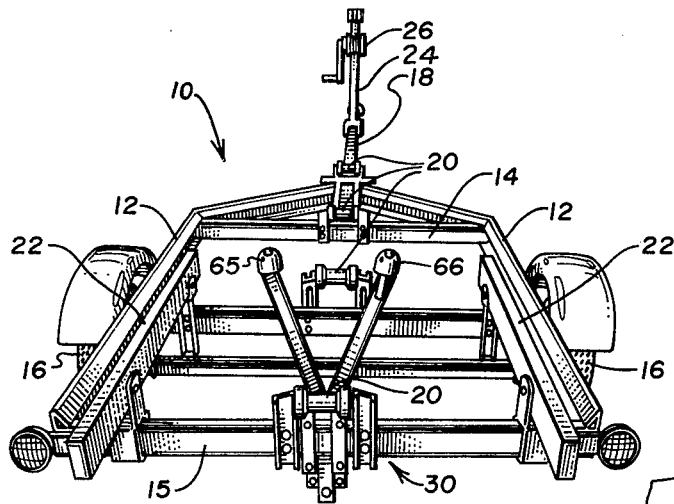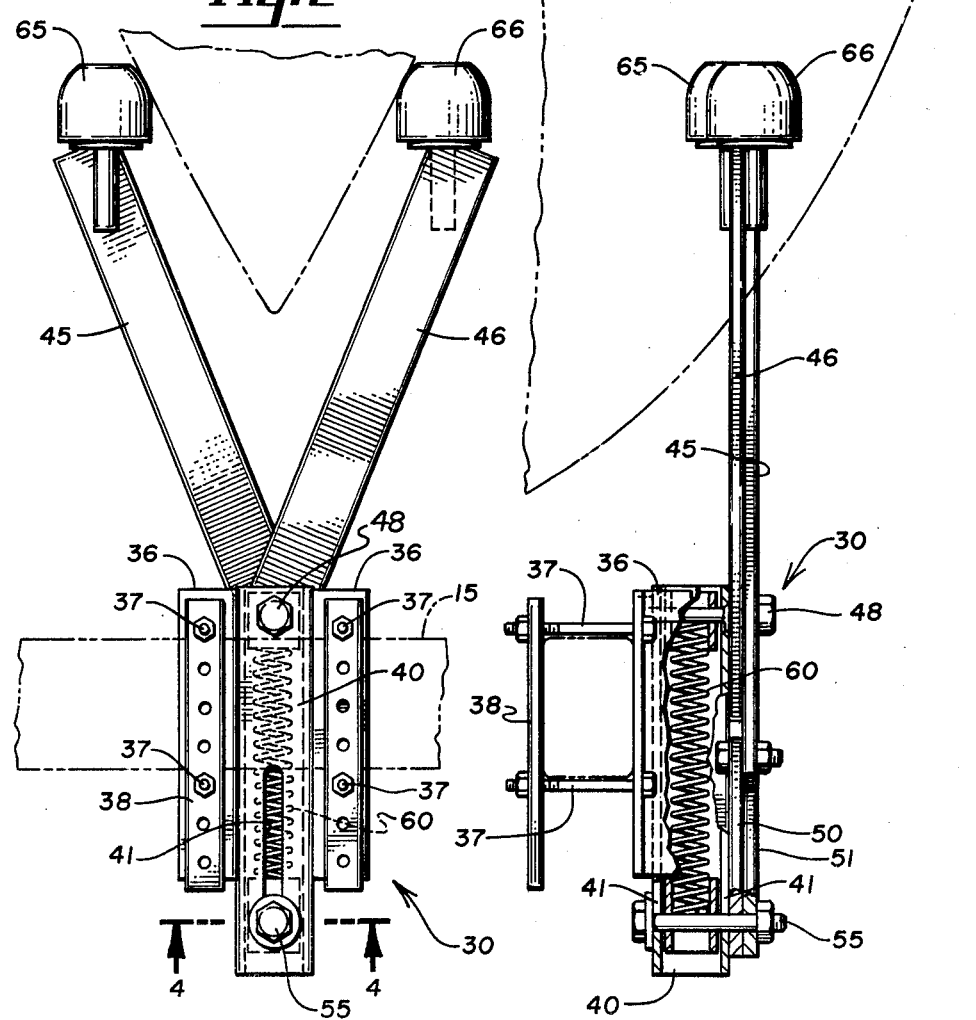

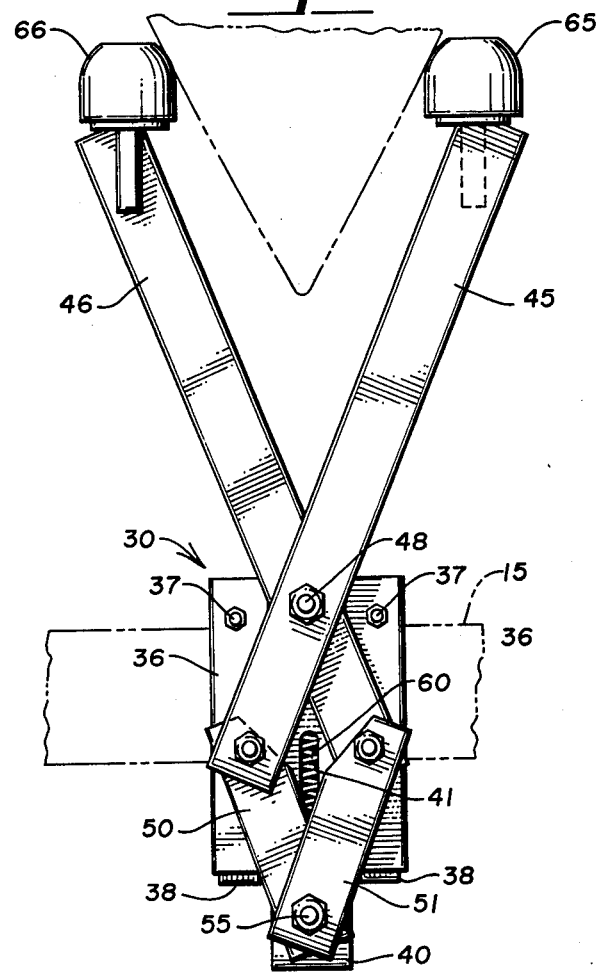
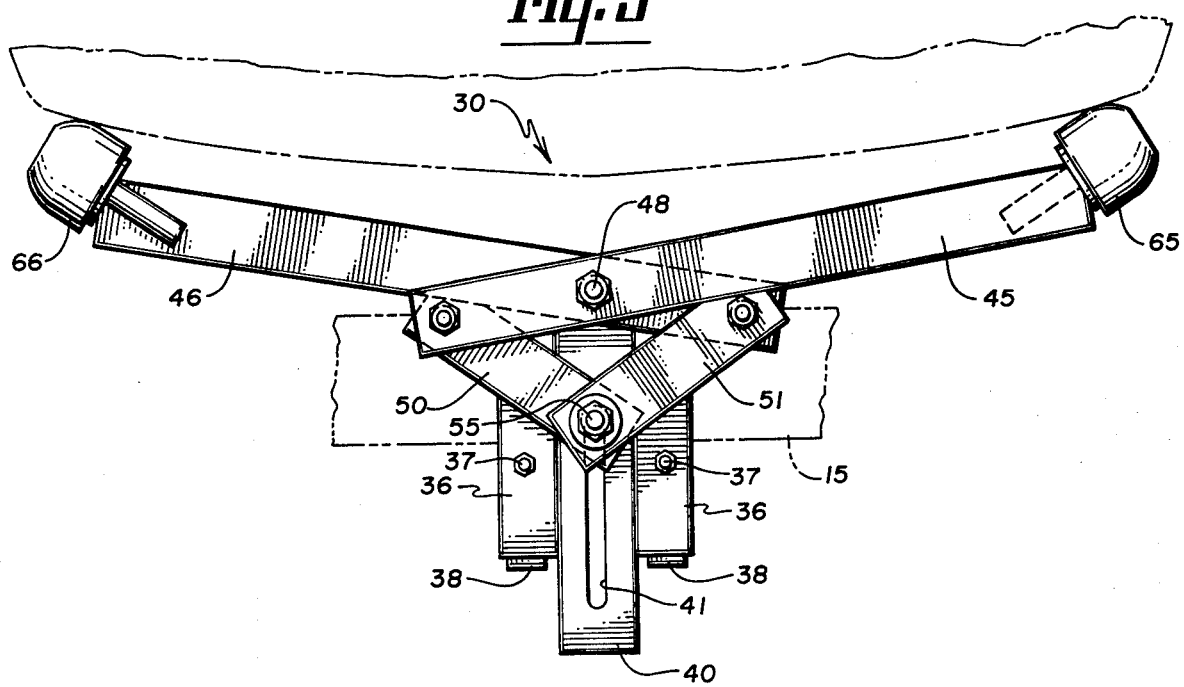

BOAT TRAILER LOADING GUIDE

FIELD AND BACKGROUND OF INVENTION

The present invention relates generally to conventional boat trailers, and more particularly to a loading guide which can be mounted on a conventional boat trailer for centering and accurately guiding a boat upon the receiving rollers and additional supporting guides of the trailer.

Trailers for loading, unloading and hauling of boats may take varying forms. They may include a frame with centrally located rollers to roll or move the keel of the boat and with bearing roller configurations distributed on the frame to fit the hull of the boat. The conventional trailer usually incorporates bottom rollers to guide the keel of the boat and has suitable guides of varying shapes thereon for guiding the hull when the boat is loaded on the trailer. The problem of loading a boat on the trailer, particularly under the conditions of waves or wind, is the translational forces tending to move the hull of the boat from a centered position on the trailer. Various structures have been incorporated in the trailer to help center and guide the boat hull as it is moved onto the trailer. These have included various arrangements of guides or lever arms mounted on the frame of the trailer which engage different parts of the hull of the boat to bias the hull of the boat as it is moved onto the trailer. Most of such arrangements have proven unsatisfactory in the sense that the guide arms are not interconnected and biased so as to properly apply a continuing centering force to the boat hull. Boat hulls generally vary in width from bow to stern and have their largest width dimension amidships such that any guide members positioned to engage such parts of the hull are unsatisfactory for initially guiding the bow end of the hull onto the trailer for centering purposes. Still other centering arrangements have employed narrowly spaced spring biased arms individually mounted on the rear of a trailer frame which may satisfactorily engage the bow end of a boat but are ineffective to hold the hull in a centered position on the trailer after it is started to move onto the trailer. Examples of such prior constructions will be found in U.S. Pat. Nos. to West, 3,477,815; King 3,603,465; and Peak 3,021,969.

SUMMARY OF THE PRESENT INVENTION

The present invention is directed to a boat trailer loading guide which may be added to a conventional boat trailer to aid in centering and guiding a boat onto a trailer from the initial contact of the bow with the trailer to the fully loaded position. It is applicable to substantially all shapes of boat hulls which vary in width from bow to stern.

The improved boat trailer loading guide includes a beam engaging means adopted to be connected to the beam of a conventional trailer. The beam engaging means mounts a pair of pivoted upright crossed guide levers which are pivotally connected at their point of crossing and have lower end portions pivotally connected respectively to one of a pair of links. The links are interconnected to one another at a point remote from the guide levers and contact a bias means positioned on the beam engaging means. The ends of the upright crossed guide levers include a pair of boat engaging and guiding members rotationally mounted thereon. The upper ends of the crossed guide levers are positioned in spaced relationship to space the boat engaging and guiding members which are held in this position by the bias means. They engage the hull to center the same over the bottom rollers of the trailer. The upright crossed guide levers pivot as the hull is engaged, causing the links associated therewith to pivot and increase the bias force on the boat engaging and guide members to insure centering of the boat hull as it is moved onto the trailer. The boat engaging and guiding members are operatively interconnected through the guide levers and links to the single spring on the beam mounting means such that they urge the boat hull to a centered position on the trailer during the entire time the boat is being loaded.

The invention will be best understood in connection with the attached drawings wherein:

FIG. 1 is a perspective view of the conventional trailer with the improved boat trailer loading guide mounted thereon;

FIG. 2 is a front end elevation view of the boat trailer loading guide in the closed biased position and with the parts of the boat trailer and boat hull shown in phantom;

FIG. 3 is a rear end elevation view of the boat trailer loading guide in the closed biased position and with the parts of the boat trailer and boat hull shown in phantom;

FIG. 4 is a sectional view of the boat trailer loading guide of FIG. 2 taken along the lines 4—4 therein.

FIG. 5 is a rear end elevation view of the boat trailer loading guide similar to FIG. 3 in a fully open position after receiving a boat hull and with parts in section; and, FIG. 6 is a side elevation view of the boat trailer and loading guide with parts in section.

DESCRIPTION OF THE PREFERRED EMBODIMENT

In FIG. 1, a generally conventional and simplified boat trailer is illustrated at 10 which includes an elongated frame having suitable longitudinal and transverse frame members 12 and 14 with the frame being supported near the rear side by a pair of wheels 16. The rear of the frame has a transverse frame member or beam 15 and a tongue 18 projects from the forward end for appropriate connections to a conventional trailer hitch on a towing vehicle. For support of a boat on the trailer, a plurality of longitudinally centered rollers 20 are mounted on the trailer 10 and laterally positioned stabilizing struts 22 are adapted to engage the under surface of the boat. The forward end of the trailer includes a standard 24 which supports a cable reel 26 with a cable (not shown) thereon adapted to be connected to a conventional eyelet at the forward end of the boat to assist in loading the boat on the trailer.

As will be seen in the drawings, a boat trailer loading guide 30 is mounted on the rear of the frame of the trailer, preferably on the rear beam 15 thereof. The loading guide includes a mounting flange formed by a pair of specified angle iron straps 36 positioned on one side of the beam 15 and securing straps 38 positioned on the other side of the beam forward thereof. They are clamped to the straps 36 through bolts 37 to secure the mounting flange to the rear beam of the trailer. A rigid tubular member 40 is secured to the straps 36 through a suitable means (not shown) and the tubular portion has slots 41 positioned on diametrical opposed surfaces of the same. A pair of upright crossed guide levers 45 and 46 are mounted on the mounting flange at their point of crossing through a suitable pivot pin 48 which extends through the upper end of the tubular member. The lower ends of the levers below the pivot point are pivotally connected to a pair of links 50, 51. The links 50, 51 are pivotally interconnected at their opposite extremities through pivot pin 55 which is positioned in the slots 41 of the tubular member to ride therein. Pivot pin 55 has suitable retaining means on either end of the same to retain the pivot pin in the slots 41 of the tubular member as it moves with the links (See FIGS. 4 and 6).

A coiled compression spring 60 is positioned within the tubular member and it has a spring retainer on one end which abuts mounting pin 48 in the tubular member or a suitable stop means therein to retain the spring in the upper end of the tubular member. The lower end of the spring has a spring retainer thereon through which the pin 55 passes connecting the spring to the links 50, 51. The force of the spring is applied to the ends of the links and through the pivotal connection of the links to the levers 45, 46. The upper end of the levers 45, 46 have load engaging and guide members 65, 66 mounted thereon. The guide members take the form of rollers which are rotatively mounted on the ends of the levers to engage the boat hull and apply the force of the levers thereto. Compression spring 60 biases the pin 55 down toward the lowermost end of the slots 41, causing the links to pivot the levers toward one another in a laterally spaced relationship. As the load engaging and guide members 65, 66 engage the hull and are separated due to increasing width of the hull, the levers 45, 46 pivot causing the links 50, 51 connected thereto to pivot and draw the pin 55 against the force of the compression spring. This increases the bias on the levers and the force applied by the guide members to the hull.

FIGS. 2 and 3 show the improved loading guide with the bow end of a boat hull in phantom initially engaging the loading guide. The guide levers 45, 46 with the hull engaging and guide rollers 65, 66 thereon contact the bow end of the hull as it initially enters onto the trailer. If the keel is off center from the center of the trailer, one of the guide levers will contact the hull and apply a centering force thereto. Since the guide levers are interconnected through the links 50,51, movement of one guide member will effect a similar movement of the other guide lever. Similarly, as the guide levers are moved from their spaced position, the compression spring is compressed to exert a greater force on the hull. This force applied to the hull provides for centering of the hull on the boat trailer in alignment with the longitudinal rollers 20 to facilitate guided movement of the hull onto the trailer. If the boat is off center, only one lever will contact the hull and a force will be exerted in the direction to move the hull in a centered position. This force will be increased depending upon the displacement of the hull from the centered position.

FIG. 5 shows the loading guide in an expanded or open position after the hull has been moved onto the trailer to a degree that the loading guide is relatively midships of the boat hull, spreading the lever members 45, 46. Whenever the hull is centered, an equal and opposite force is applied to each side of the hull to maintain it in the centered position. If the boat hull is moved onto the trailer, this centering force is maintained to insure that the boat remains centered on the trailer as it is moved to the normal rest position on the trailer.

FIG. 6 shows a side elevation view of the boat trailer loading guide 30 with the straps 36 of the mounting flange being positioned on one side of the rear beam 15 of the trailer and the clamping plates 38 on the other side and with the bolts 37 securing the same thereto. The loading guide is removably attached to the rear beam of the trailer and may be positioned slightly ahead of the rearmost roller 20 on the trailer frame.

The guide levers and links are generally of the same thickness and opposite link and levers align in the same plane in their pivotal interconnection (See FIG. 6). Therefore, as the guide levers and links pivot to their extreme position, they contact one another and form a limit stop on the spreading of the levers. This limit stop preferably occurs at or near complete compression of the spring 60. Similarly, the loading guide is preferably mounted on the rear beam of the trailer in such a position that extreme spreading of the lever and full compression of the spring does not occur, since the boat hull will be resting on the trailer rollers prior to such extreme of pivot of the levers. This insures that the loading guide will always be in a position to apply a centering force to the boat hull.

The improved boat trailer loading guide may be readily added to a conventional boat trailer by affixing the same to the rear beam thereof in a centered relationship to the center guide rollers on the trailer. In use, as the boat hull is being pulled onto the trailer, the guide levers with the boat hull engaging and guide roller members 65, 66 thereon will contact the hull and center the same with respect to the trailer, insuring that the boat hull is maintained in a centered relationship as it is pulled onto the trailer. A force is applied to the boat hull initially if the trailer is off center and until it moves to a centered relationship. When the hull contacts only a single lever initially, that is when it is off center with respect to the trailer, the lever contacted begins to pivot and through its associated link, it applies a force to the pin in the slot which creates a wedging action increasing the resistance of the pin to movement in the slot against the spring. This increases the resistance or biasing effect to further movement of the lever contacted and increases the centering force applied to the hull. When the hull is centered, a uniform force on either side of the hull is maintained to insure that the boat hull will maintain in a centered relationship on the trailer irrespective of wind or waves. The loading guide spreads to conform to any width hull or variation in hull from bow to stern to insure a positive centering force for loading of the boat onto the trailer.

In considering this invention it should be remembered that the present disclosure is illustrative only and the invention should be determined by the appended claims.

What I claim is:

1. A boat trailer loading guide for a boat trailer having a transverse beam at its rear end comprising:
    (a) a pair of upright crossed guide levers pivotally interconnected at their point of crossing and each having lower end portions extending downwardly therefrom in spaced relation and having laterally spaced upper portions;
    (b) a pair of links each of which is pivotally connected to the lower end portion of its respective guide lever and said pair being pivotally interconnected at a point along their length remote from their points of connection to their respective guide levers;
    (c) means connected with said links for constraining said point of pivotal interconnection for vertical movement;

(d) bias means engaging said links adjacent their point of pivotal interconnection and biasing the upper portions of said guide levers toward each other through said links;
(e) a pair of boat engaging and guiding members, one each of which is carried by the upper end portion of one of said guide levers; and
(f) beam-engaging means connected to said guide levers and pivotally supporting the same at their point of crossing and constructed and arranged to engage such a rear beam of such a boat trailer to thereby pivotally mount said guide levers thereupon in transverse upright boat-receiving and guiding relation.

2. The structure defined in claim 1 wherein:
(g) said bias means comprises a compression-type spring engaging said links adjacent their point of interconnection and biasing the interconnected portions of said links away from the point of interconnection of said guide levers whereby said boat-engaging and guiding members are biased toward each other.

3. The structure defined in claim 1 wherein:
(h) said bias means includes a rigid tubular member and a spring disposed within said tubular member and biasing the interconnected portions of said links away from the said point of interconnection of said guide levers;
(i) said tubular member being mounted on said beam-engaging means.

4. The structure defined in claim 1 wherein;
(j) said bias means includes a rigid tubular member fixedly mounted on said beam-engaging means and a compression-type spring mounted within said tubular member in biasing relation with the interconnected portions of said links;
(k) said guide levers being pivotally mounted at their point of crossing upon said tubular member;
(l) said spring biasing said interconnected portions of said links away from the point of interconnection of said guide levers.

5. The structure defined in claim 1 and:
(m) a rigid tubular member fixedly mounted on said beam-engaging means;
(n) said tubular member having a longitudinally slotted side wall;
(o) said bias means comprising an upright compression-type spring confined within said tubular member,
(p) said bias means including a connector extending through said slot beneath the lower end portion of said spring and between the interconnected portions of said links and connecting the same and moving upwardly and downwardly therewith within said slot as said guide levers are pivoted relative to each other.

6. The structure defined in claim 1 wherein
(q) said guide levers are pivotally connected at their point of crossing upon said beam-engaging means.

7. The structure defined in claim 1 wherein
(r) said beam-engaging means comprises a clamping member upon which said guide levers are pivotally mounted at their point of crossing.

8. In a boat-transporting vehicle,
(a) a boat trailer constructed and arranged to support and transport a boat thereupon and having a transversely extending rear beam;
(b) a removable clamp member constructed and arranged to be mounted upon said rear beam in fixed relation thereto and including a mounting plate as one element of said member
(c) a rigid tubular member fixedly mounted on said mounting plate in upright relation and having a slotted vertically side wall extending in a plane generally parallel to said rear beam and rearwardly thereof;
(d) a compression-type spring contained within said tubular member and extending longitudinally thereof and having its lower end portion free to move vertically upon compression of said spring;
(e) a pair of upright crossed guide-levers pivotally interconnected at their point of crossing and pivotally mounted upon said tubular member, each of said guide levers having lower end portions extending downwardly in spaced relation and having laterally spaced upper portions;
(f) a pair of links each of which is pivotally connected adjacent one of its ends to the lower end portion of one of said guide levers and extends downwardly therefrom and is pivotally connected to the other of said links adjacent its opposite end portion;
(g) means extending through said slot and engaging said pivotally connected end portions of said links with the lower end portion of said spring;
(h) said spring biasing said links downwardly and thereby urging said upper portions of said guide levers toward each other, and
(i) a pair of boat-engaging and guiding rollers, one each of which is rotatably mounted upon said upper portions of one of said guide levers of guiding a boat as it is brought to bear thereagainst during boat-loading operations.

9. A boat trailer loading guide for a boat trailer having a transverse beam at its rear end comprising:
(a) a pair of upright crossed guide levers pivotally interconnected at their point of crossing and each having lower end portions extending downwardly therefrom in spaced relation and having laterally spaced upper portions;
(b) linkage means pivotally connected to the lower end portions of said guide levers and including a point of pivotal interconnection at a point remote from said pivotal connection to the lower end portions of said guide levers;
(c) means connected with said linkage means for constraining said point of pivotal interconnection for vertical movement;
(d) bias means engaging said last named means at its point of pivotal interconnection and biasing the upper portions of said guide levers toward each other through said means;
(e) a pair of boat engaging and guiding members, one each which is carried by the upper end portion of one of said guide levers; and
(f) beam-engaging means connected to said guide levers and pivotally supporting the same at their point of crossing and constructed and arranged to engage such a rear beam of such a boat trailer to thereby pivotally mount said guide levers thereupon in transverse upright boat-receiving and guiding relation.

* * * * *